(12) United States Patent
Bell, Jr. et al.

(10) Patent No.: US 6,608,808 B1
(45) Date of Patent: Aug. 19, 2003

(54) PSEUDO TELECENTRIC OPTICAL STORAGE SYSTEM

(75) Inventors: Bernard W. Bell, Jr., Scotts Valley, CA (US); Amit Jain, Sunnyvale, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/258,093

(22) Filed: Feb. 24, 1999

Related U.S. Application Data

(60) Provisional application No. 60/077,662, filed on Mar. 11, 1998.

(51) Int. Cl.[7] .................................................. G11B 7/00
(52) U.S. Cl. ................................................. 369/112.24
(58) Field of Search ....................... 369/112.23, 112.24; 359/211

(56) References Cited

U.S. PATENT DOCUMENTS

| | | | | |
|---|---|---|---|---|
| 5,483,511 A | * | 1/1996 | Jewell et al. ............ 369/44.37 |
| 5,497,359 A | * | 3/1996 | Mamin et al. ........... 369/44.15 |
| 5,504,731 A | * | 4/1996 | Lee et al. .............. 369/112.24 |
| 5,754,514 A | * | 5/1998 | Guerra ....................... 369/116 |
| 5,828,482 A | * | 10/1998 | Jain ............................ 369/112 |
| 5,910,940 A | * | 6/1999 | Guerra .................... 369/275.1 |
| 5,963,532 A | * | 10/1999 | Hajjar ........................ 369/112 |
| 6,009,064 A | * | 12/1999 | Hajjar ........................ 369/112 |
| 6,084,846 A | * | 7/2000 | Jordaache et al. .......... 369/112 |
| 6,111,840 A | * | 8/2000 | Hajjar ........................ 369/112 |

* cited by examiner

Primary Examiner—Aristotelis M. Psitos
(74) Attorney, Agent, or Firm—Fish & Richardson P.C.

(57) ABSTRACT

An electro-optical storage system based on air-bearing-suspended optical head in a near-field configuration. The optical head effects a lens having front and rear focal planes. The head is spaced from an optical medium by a fraction of a wavelength. An imaging lens is positioned relative to the optical head so that the image of a beam steering element is at a focal plane of the optical head close to the imaging lens to form a telecentric system to minimize beam walk. More preferably, the imaging lens is positioned to deviate the image plane of the beam steering element away from the focal plane of the optical head by a desired spacing to form a pseudo telecentric system to minimize energy asymmetry in the reflected beam.

15 Claims, 17 Drawing Sheets

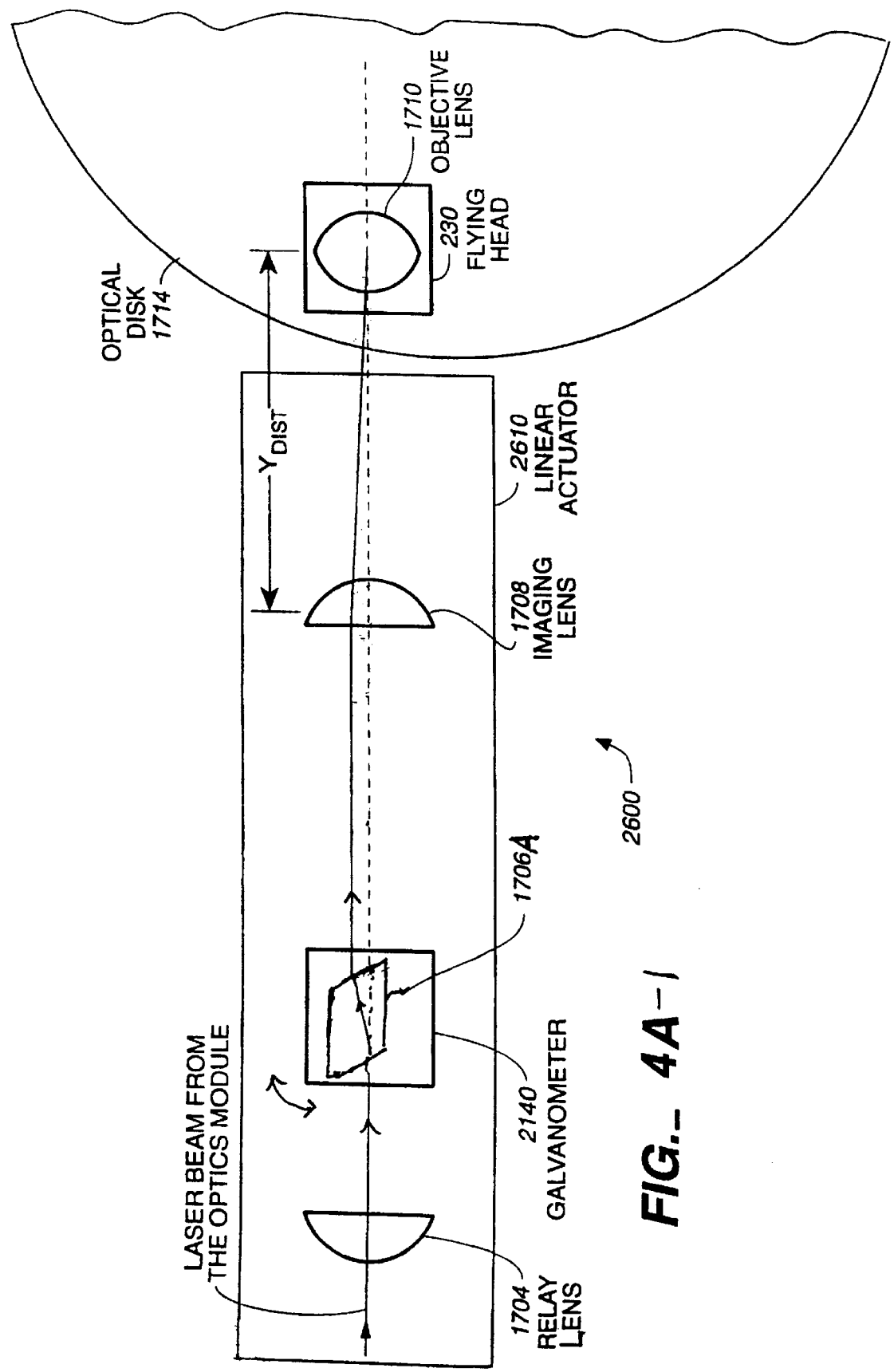
FIG._ 4A-1

0°

1°

2°

2.5°

PSEUDO TELECENTRIC OPTICAL STORAGE SYSTEM

This application claims the benefit of the U.S. Provisional Application No. 60/077,662, filed on Mar. 11, 1998.

FIELD OF THE INVENTION

The present invention generally relates to optical storage and data retrieval, and more particularly, to optical imaging techniques and configurations in a near-field optical storage system.

BACKGROUND

Optical storage can achieve high areal density data storage. The areal density of an optical storage device, in principle, may be limited only by the diffraction limit of spot size of an illuminating optical beam for reading or writing. Electro-optical data storage systems based on magneto-optical materials can be configured to produce an areal data density of up to or higher than about ten gigabits per square inch.

One approach to increase the areal data density in an optical storage system uses a reduced spot size. Due to the diffraction limit, a monochromatic optical beam can be focused to a significantly reduced or minimized spot size on the order of a wavelength. Light sources with short wavelengths, such as those toward the blue end of the optical spectrum, may be used to further decrease the spot size and thereby achieve an even higher areal density.

The numerical aperture of the objective lens may be increased to reduce the spot size at a given wavelength within the diffraction limit. This also increases the areal data density.

SUMMARY

The present disclosure provides an electro-optical data storage system which includes an optical head for reading and writing and a head positioning system, an optics module with beam relay optics and signal detectors, an optical medium, and an electronic control system. The optical head is spaced from an active recording layer in the medium by a fraction of one wavelength of light to form a near-field configuration. The optical coupling between the head and the medium in such a near-field configuration can be effected by evanescent optical coupling. The areal data density, therefore, can be increased by focusing a read/write beam to a dimension smaller than the air-incident or free-space diffraction-limited minimum spot size.

The optical head may include one or more optical elements (e.g., an objective lens and a near-field lens) to effect a lens that has front and back focal planes. The optical head may be preferably suspended over the optical medium by a thin air-bearing surface to permit optical coupling to and from the optical medium by evanescent waves. The optical head may have a high numerical aperture up to or greater than unity for the optical head. In one implementation, the optical head includes an objective lens and a near-field lens that is spaced from each other at a fixed distance. The near-field lens may have a high index of refraction to achieve a desired numerical aperture. One embodiment of the near-field lens is a solid immersion lens.

The optical medium may be preferably structured to form a first surface recording configuration in which one or more active recording layers are formed on or near the top surface of the medium and spaced from the bottom of the flying head by a distance less than one wavelength of the optical source.

The optics module may be a fixed optics module in which the relative positions of different optical elements are fixed at predetermined distances. In one embodiment, the fixed optics module includes a light source, a data/servo detector, and beam control optics which may include a relay lens and an imaging lens to guide a read/write beam to and from the optical head.

A primary feature of the disclosure is to significantly reduce or minimize an asymmetric intensity distribution in the spot transmitted to and reflected from the medium and the read/write head.

Preferably, the imaging lens and the lens effected by the optical head (e.g., comprised of the objective lens and the near-field lens) form a telecentric imaging configuration in which a beam steering surface of a steering device is imaged to the front focal plane of the optical head closer to the imaging lens, i.e., the telecentric location. This configuration can reduce the effect of beam walk in the reflected beam from the optical medium which may be caused by beam scanning or other factors that affect the direction of the read/write beam incident to and reflected from the medium.

More preferably, the imaging lens and the optical form a pseudo telecentric imaging configuration in which the imaging plane is shifted from the telecentric location by a predetermined distance to reduce the asymmetric intensity distribution. Such asymmetric intensity distribution may be caused by beam walk and other adverse effects such as Fresnel reflections from the surfaces in the flying head and the optical medium, the total internal reflection from the near-field lens, beam clipping due to the limited aperture of the optical path in the flying head, and wavefront and ray aberrations.

An actuator in either rotary or linear configuration may be used as a coarse positioning means for the optical disk drive although other positioning devices may also be used. The fixed optics module and the flying head are attached to an actuator. Hence, any user data sector on the optical medium may be addressed with a read/write beam by adjusting the actuator. The beam control optics in the fixed optics module may include a beam-steering element such as a galvo mirror, a galvo-controlled prism or transparent plate to provide a fine positioning means for guiding the read/write beam.

These and other aspects and advantages of the present invention will become more apparent in light of the following detailed description, the accompanying drawings, and the appended claims.

BRIEF DESCRIPTION OF THE DRAWINGS

FIG. 4A-1 further shows that a prism is used as a beam steering elmeent to replace the transparent plate shown in FIG. 4A.

DETAILED DESCRIPTION OF THE PREFERRED EMBODIMENTS

Figure 1:
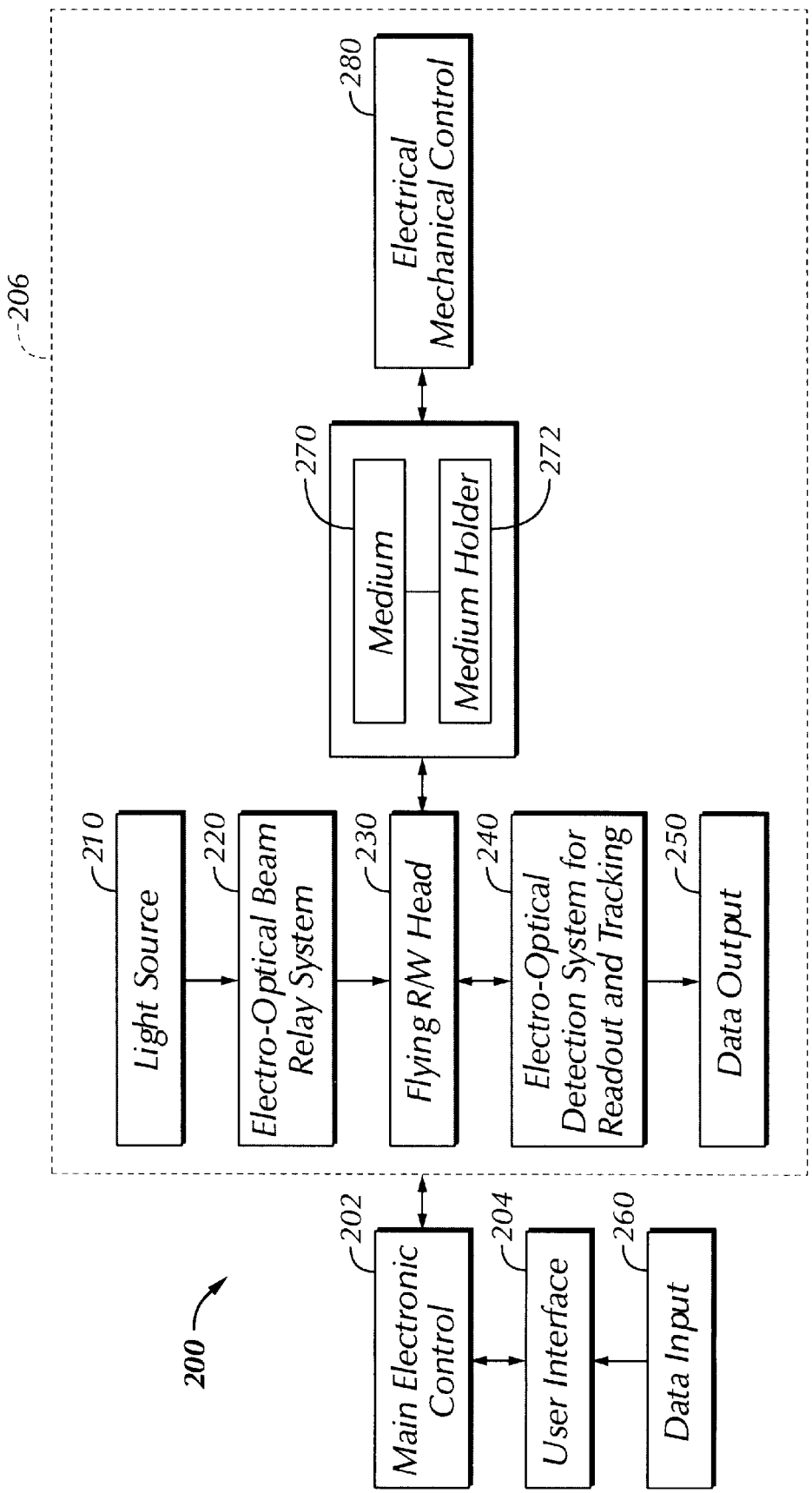
FIG. 1 is a block diagram showing a preferred optical rewritable storage system.

One embodiment of a near-field storage system is shown in the block diagram 200 of FIG. 1. The lines indicate a communication signal by optical and/or electrical carriers or both.

The embodiments describe special lens configurations for an imaging lens and a lens assembly formed by an objective lens and a near-field lens to reduce adverse energy variations in the reflected beam which cause an offset in tracking error signals. The imaging lens is so spaced from the lens assembly that an image formed by the imaging lens is at or near the focal plane of the lens assembly that is closer to the imaging lens.

An optical storage medium 270 in the form of a disk or other format can be of a read-only type, or write-once-read-many type, or a write-many-read-many rewritable type. Data is spatially distributed and stored in the medium 270 through a predetermined encoding method. The medium 270 can be removable with a cartridge-type protective housing and a respective load/unload system. Alternatively, the medium 270 can also be configured as a fixed medium such as a hard disk drive. More specifically, a medium holder 272 is implemented to hold the medium 270 at a proper position relative to the optical head 230 and can be configured to, holds either a fixed medium or a removable medium 270.

A source of electromagnetic radiation, e.g., a light source 210, produces a light beam at a wavelength to which the optical medium 270 is responsive. A beam relay system 220 shapes the beam in a desired spatial profile and guides the beam with desired propagation characteristics to a flying read/write head 230. The flying head 230 further shapes and focuses the beam generated by the light source 210 onto the optical medium 270 to read and/or write data thereon.

The flying head 230 and the optical medium 270 are positioned relative to each other so that the optical spacing therebetween is less than one wavelength of the light produced by light source 210. This is known as a "near-field" configuration. The numerical aperture of the optical head 230 with respect to the medium 270 can be equal to or greater than unity in the near-field configuration. An optical read/write beam exiting the near-field lens can be coupled to the optical medium by evanescent waves. An air-bearing surface is formed at the base of the flying head 230 above the top surface of the medium 270 to maintain a desired spacing between the head 230 and the medium 270 without a focusing servo control loop which uses an actuator to move the head or lens assembly 230.

For a given wavelength, the focused spot size can be reduced by increasing the numerical aperture ("NA") of a focusing optical element. One approach to achieve a large numerical aperture in the flying head is by combining a near-field lens with an objective lens. The relative position between the objective lens and the near-field lens is fixed without a servo control. The near-field lens may be made of a high-index optical material to effect a large effective numerical aperture in the flying head. For example, a solid immersion lens ("SIL") of an isotropic or homogeneous type, a graded index lens ("GRIN lens") or a "Gradium lens" may be used as the near field lens to achieve an NA up to and greater than unity.

In the above near-field configuration with a numerical aperture greater than unity, light is coupled by evanescent waves through a thin gap, in addition to the usual wave propagation between the exit surface of the flying head and the optical medium.

Alternatively, a non-near-field configuration can also be used with the flying head 230, in which case the coupling between the flying head and the recording layer is by the usual light wave propagation. The Numerical aperture of such a configuration is less than unity.

The relative position and motion of the flying head 230 and the optical medium 270 are determined and controlled by both the position and movement of the flying head 230 and optical medium 270. In particular, an electrical-mechanical control 280 is used to control the position and motion of the flying head relative to the optical medium 270. For example, a motorized spindle system can be included in the electrical-mechanical control 280 if the optical medium 270 is in a disk format.

The light spot incident on the optical medium 270 is reflected. In a recording operation, the reflected beam from the optical medium 270 is encoded with beam-tracking information. In a readout operation, the reflected beam is usually modulated with both tracking information and the data stored on the optical medium 270. The reflected light from the optical medium 270 is received by the flying head 230 and routed to a detection system 240 that includes photodetectors for both data extraction and obtaining track-following servo information that is used to maintain the beam on a desired track.

Recording data onto the optical medium 270 can be done by either modulating a writing beam via an optical modulation of beam intensity, phase, or polarization (either at the light source 210 or at the beam relay system 220), or by directly modulating the state of the optical medium 270 through thermal or electromagnetic methods.

A main electronic control 202 can be implemented to monitor and control all components and subsystems. A user interface 204 may include, but is not limited to, a computer keyboard, a display, electrical and mechanical switches and control buttons.

These system components and their operations are described in U.S. patent application Ser. No. 08/846,916, "Electro-optical storage system with flying head for near-field recording and reading", filed on Apr. 29, 1997, the entire disclosure of which is incorporated herein by reference.

Figure 2:
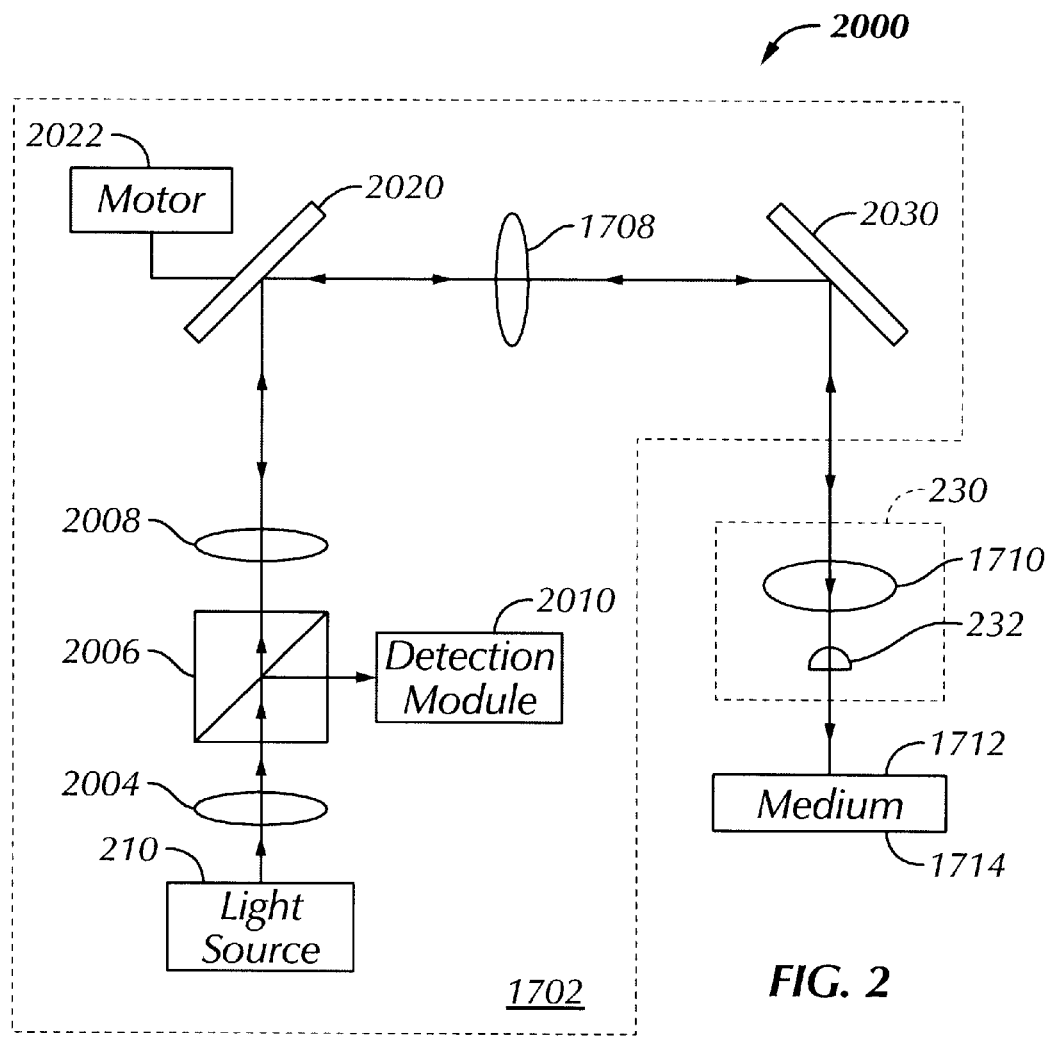
FIG. 2 is a schematic illustration showing an embodiment of the optical train using a galvo reflector for precisely positioning the read/write beam on an optical medium.

In a practical implementation of the system of FIG. 1, a positioning mechanism is employed to guide the read/write beam to a desired location on the optical medium. FIG. 2 shows one exemplary optical train 2000 linking a fixed optical module 1702 ("FOM") to an optical medium 1714. The fixed optical module 1702 is fixed to a base of the system and does not move with the actuator arm. The optical head 230 is coupled to the actuator arm.

A light source (e.g., a laser) 210 emits a light beam which is corrected and collimated by optical elements 2004 and 2006. A relay lens 2008, Reflectors 2020, 2030 and an imaging lens 1708 guide the collimated beam to the flying head 230 comprising an objective lens 1710 and a near-field lens 232. The beam is then focused onto a surface 1712 of the optical medium 1714 by the flying head 230. The reflected beam from the optical medium 1714 is then received by the near-field lens 232 and the objective lens 1710 and reflected by the optical medium 1714 back to the optical module 1702. An optical element 2006 (e.g., a beamsplitter) guides at least a portion of the reflected beam to a detection module 2010 having detectors for both data extraction and track following servo information.

Track following, i.e., maintaining a beam on a proper track, is done by a servo system using tracking error signals produced by grooves or tracking indicators in the optical medium 1714. A galvanometer motor 2022 can be used to control the reflector 2020 (or 2030) to adjust the direction of the beam to follow a track. FIG. 2 shows the galvanometer 2022 connected to the first reflector 2020 for track following.

Coarse beam positioning and seeking may be accomplished by implementing an actuator. Several types of actuators can be used in accordance with the present invention to position the flying head over the optical medium at a selected location, two of which are described here: a rotary actuator and a linear actuator.

Figure 3:
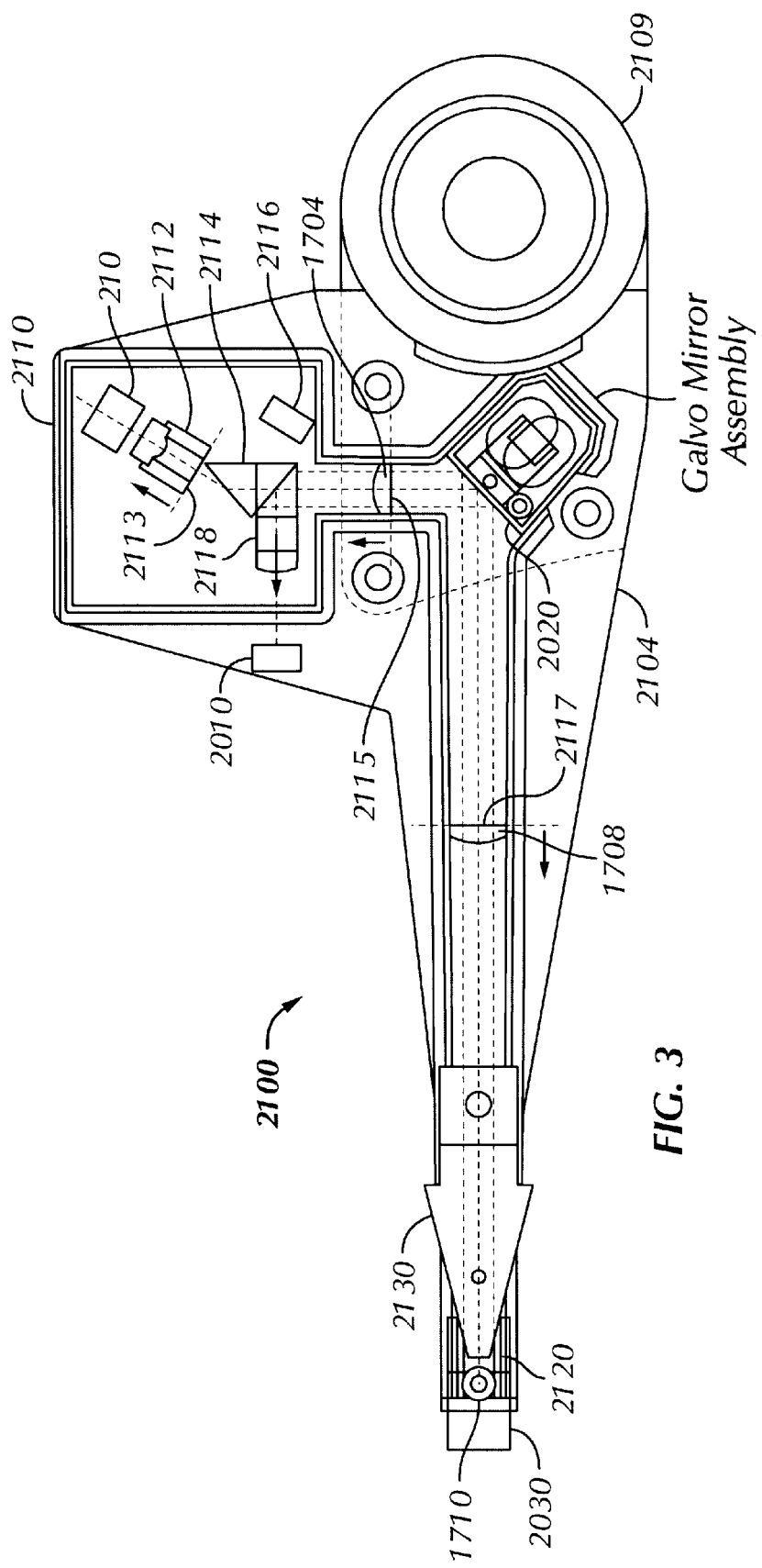
FIG. 3 is a schematic illustration showing a rotary actuator holding a fixed optics module and a flying head with a galvo mirror for fine positioning.

Alternatively, the optical elements in the fixed optics module of FIG. 2 can be placed on the actuator arm and move with the actuator. FIG. 3 shows such a system based on a rotary actuator 2100. The rotary actuator includes a hub 2109 and a rotary actuator arm 2104 substantially parallel to the surface 1712 and pivotally mounted to a drive base plate (not shown). The rotary actuator has a coil positioned to interact with a permanent magnet (not shown) that is fixed to the drive base plate (also not shown) for controlling movement of the arm 2104. The actuator arm 2104 laterally extends from the side of the hub 2109 to cantilever the optical head, including the objective lens 1710 and the near-field lens 232 integrated in the slider 2120, over the surface of the optical medium. The actuator arm 2104 provides a coarse positioning mechanism for moving the optical head to a desired point on the optical medium.

The system 2100 may include an optics module 2110 mounted on a portion of the actuator arm 2104. The optics module 2110 may include the light source 210, a collimator lens 2112, an anamorphic prism 2114, a feed forward monitor 2116, a polarization splitter 2118, and the data and servo detector 2010. A light beam generated by the light source 210 is collimated and circularized by the collimator lens 2112 and the anamorphic prism 2114, respectively. The beam is guided by the relay lens 1704, the galvo mirror 2020 in a galvo mirror assembly, the imaging lens 1708, and the folding mirror 2030 to the objective lens 1710 and the near-field lens 232 (not shown). The galvo mirror 2020 is controlled to provide a fine positioning mechanism for precisely positioning the read/write beam spot on a desired point on the optical medium.

All the optical elements in the optical train, including the optics module 2110, the relay lens 1704, the galvo mirror 2020, the imaging lens 1708, and the folding mirror 2030 are secured to the rotary actuator arm 2104 and have a specified spatial relation with one another regardless of the position of the actuator arm 2104. The optical train further includes the flying optical head which has the objective lens 1710 and a near-field lens integrated with an air-bearing slider 2120. The spacing between the objective lens 1710 and the near-field lens 232 is fixed at a constant without a servo control loop. The slider 2120 is positioned to float over the surface 1712 via a resilient flexure 2130.

As the arm 2104 rotates, all the optical elements of the optical train rotate accordingly. The coarse positioning of the flying head relative to the optical medium is done by rotating the actuator arm 2104; fine beam tracking is done by adjusting the beam with the galvo mirror 2020.

Figure 4A:
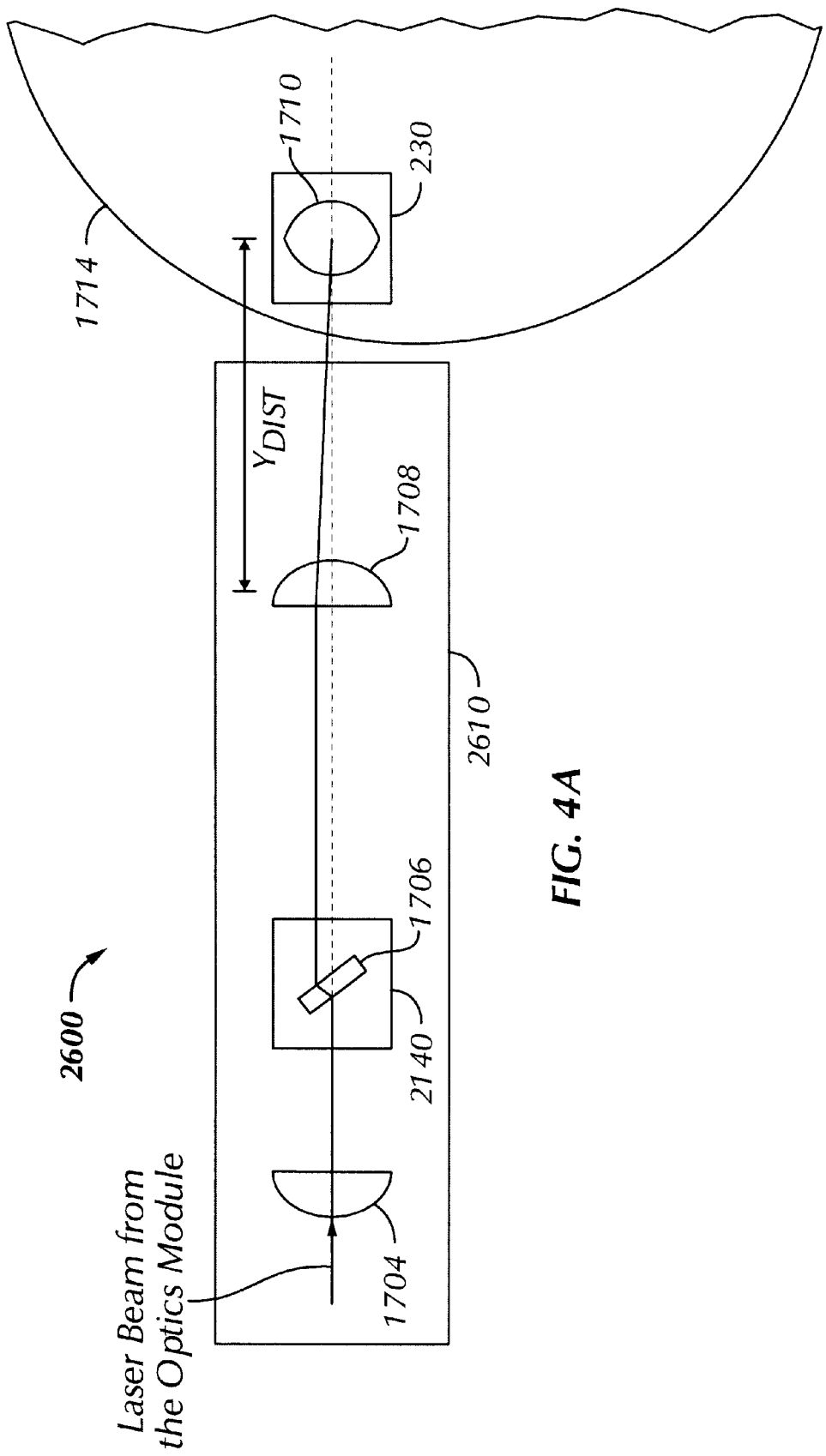
FIGS. 4A, 4B, and 4C schematically illustrate a linear actuator and depict graphs showing the operation thereof for an optical disk drive.
Figure 4B:
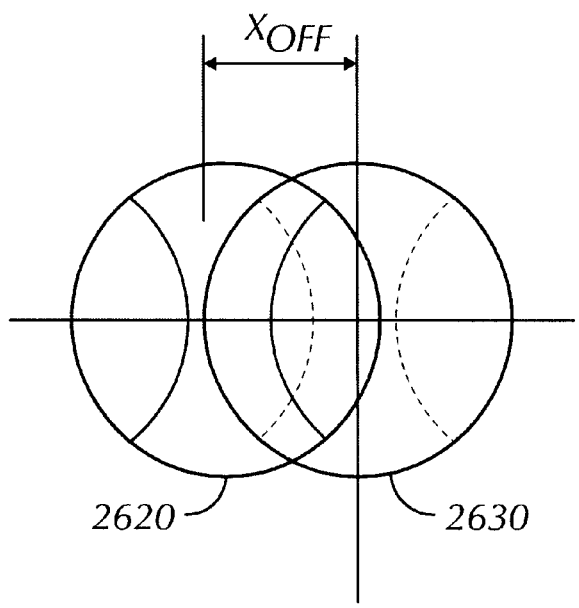
Figure 4C:
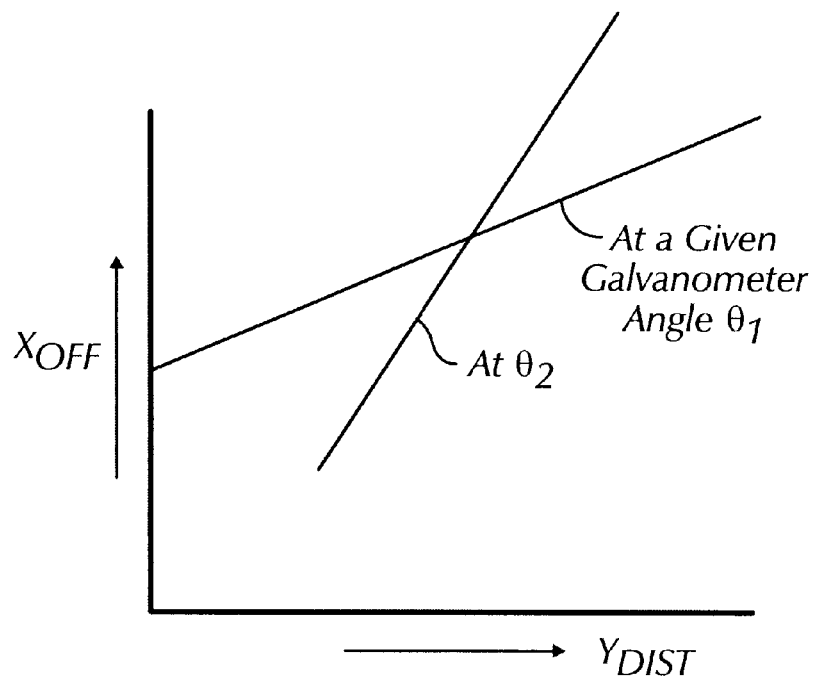

FIGS. 4A to 4C show a linear actuator system 2600 having all optical elements mounted on the linear actuator arm. In this embodiment, a distance, $Y_{DIST}$, between the objective lens 1710 and the imaging lens 1708, is adjustable by the linear actuator 2610 rather than being fixed in the system as with a rotary actuator. An optical steering element such as a transparent plate 1706 or a prism 1706A shown in FIG. 4A-1 can be mounted on a galvanometer 2140 to change the direction of the read/write beam. This provides a mechanism of fine beam positioning and tracking.

In operation, the linear actuator 2610 moves the flying head 230 along the optical axis of the optical train to coarsely position the flying head relative to the optical medium 1714. A change in the distance $Y_{DIST}$ can result in a displacement of the beam on the objective lens. This change further causes the reflected beam to shift from the desired position ("beam walk") on the servo detector on the optics module.

Referring to FIGS. 4B and 4C, an offset $X_{OFF}$ between an ideal beam location 2630 and an actual beam location 2620 observed by the servo detector in the optics module varies approximately linearly with the position of the flying head 230 relative to the imaging lens 1708. By knowing the disk radius where the flying head 230 is positioned and the position of the galvanometer 2140 (e.g., the angle θ as provided by a position-sensing detector), a tracking servo control loop may be used to correct the tracking error due to the offset $X_{OFF}$ for all disk radii and a range of beam angles.

The optical:medium used in the present invention is usually a magneto-optic material in the form of a disk. Data is written on and read from such a magneto-optic disk on tracks defined by lands and grooves that are arranged in a spiral or concentric configuration. During a readout, a segment of a data track can modulate the phase and intensity distribution of a read/write beam reflected from the optical disk. This modulation effectively superimposes the data onto the beam. Conversely, during a writing process, the write beam can be modulated to alter the magnetic states of the recording medium to record data.

The tracking grooves produce certain tracking patterns associated with the relative positioning of a read/write beam with respect to the adjacent grooves or lands in the reflected beam. A detector module has a servo detector for sensing the reflected beam to generate a tracking error signal ("TES") and a data detector for extracting the data during a readout from the read/write beam. This TES signal is used to maintain the beam on a desired track.

One scheme to produce the TES signal is by interfering the diffracted beams with the zero-order reflected beam from a grating formed by the tracking grooves to generate the tracking patterns. For example, the (±1) diffracted beams within the aperture of the near-field lens can interfere with the zero-order reflected beam to form two interference patterns.

Figure 5A:
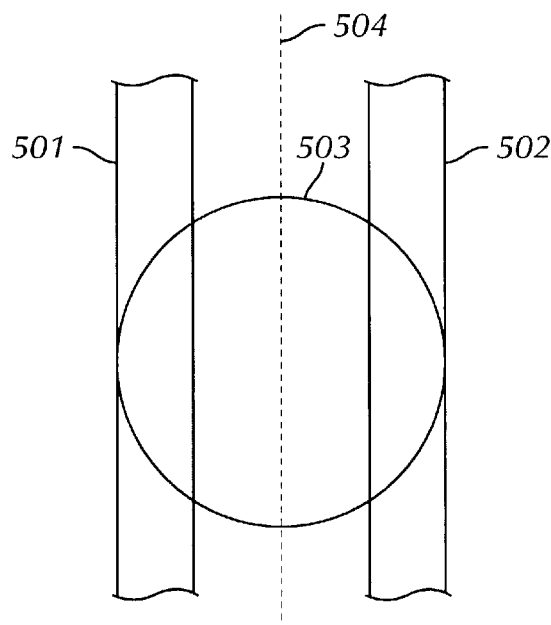
FIG. 5A is a diagram illustrating a relative position of a read/write beam spot on an optical medium with tracks.
Figure 5B:
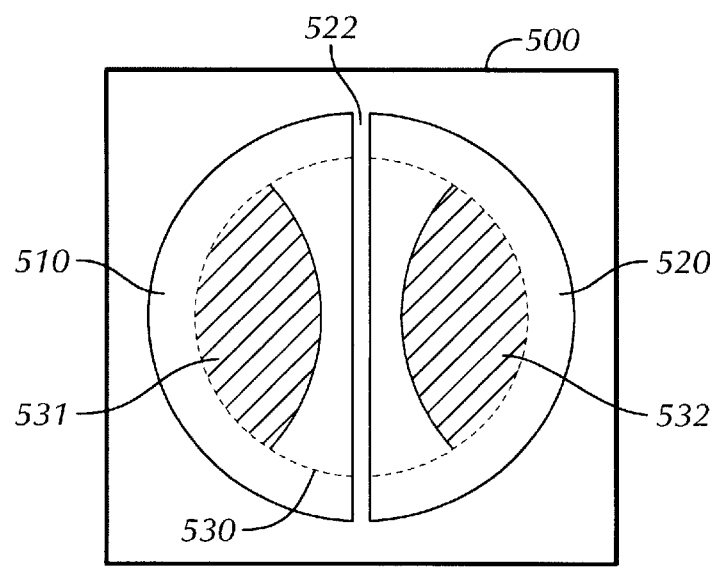
FIG. 5B is a diagram illustrating operation of a split detector in generating a tracking error signal.

A TES signal may be detected by using a split detector scheme. FIG. 5A shows enlarged segments of a land with adjacent grooves 501 and 502 on the optical disk. Dashed line 504 parallel to the grooves represents the desired center track of the read/write beam which is parallel to the tracks in the medium. A beam projects a spot 503 on the disk by passing through the optical train. FIG. 5B shows a split detector 500 has a first sensor 510 and a second sensor 520 that are split along a direction parallel to the tracks 501 and 502. Features 531 and 532 indicate.the interference patterns in the reflected beam and are used to sense the spot position relative to the track center. The TES signal is the difference between the output signals of sensors 510 and 520. If the spot is right at the center of the track, the optical intensity distribution at the split detector 500 is symmetric and the electrical signals generated by the sensors 510 and 520 are identical. Therefore, the average of the TES signal is zero. If the beam is positioned off the center line between two adjacent grooves or lands, a non-zero value for the averaged TES signal is generated. The sign and magnitude of the TES signal indicate the direction and amount of offset from the desired track center. The control system maintains the beam spot at the desired track position by reducing or minimizing the TES signal.

The TES signal, generated when the tracking servo loop is open and the spot is crossing the tracks, is in general a sinusoidal signal with a period corresponding to twice the spatial period of the tracking grooves (i.e., groove pitch). When the tracking servo loop is closed in the track following mode, the averaged DC value of the TES is used to indicate whether or not a read/write beam deviates from a desired track. In a practical implementation, track following may be considered satisfactory if the averaged DC value of the TES is within a certain tolerance range.

For convenience, the TES signal may be divided by the total signal detected by the split detector to obtain a normalized TES signal ("NTES"). The sign and magnitude of the NTES signal are thus used for tracking operations. One advantage of using NTES instead of TES is that the variation in the beam power is automatically compensated so that the magnitude of the NTES can be used to determine the amount of beam offset for different power levels of the read/write beam.

Alternatively, a split detector may include four separate sensors that are arranged in a symmetric configuration with two sensors to sense one side of the desired track and the other two sensors to sense another side.

In either rotary actuator or linear actuator configurations, a beam steering element such as a galvanometer is configured to rotate in an angular range to provide fine beam positioning and tracking. When the read/write beam is steered in a way that takes it away from the optic axis of the flying head, the reflected read/write beam may not retrace the path of the original read/write beam from the fixed optics module. This can result in an offset, called beam walk, at the servo detector. This beam walk produces an asymmetric energy distribution at the servo detector. This asymmetric energy distribution is really a source of error. In reality, the read/write beam can be on the center of the desired track but a non-zero offset in the averaged DC value of the NTES or TES can still be produced. Thus, the beam walk produces a false tracking error. If left uncorrected, this false tracking error can drive the track servo loop to move the spot off the track center in an attempt to reduce the track error to zero.

A special imaging configuration, called herein "telecentric", can be used to alleviate this undesirable beam walk. FIG. 2 shows that the flying head 230 is effectively a positive lens which is formed by combining the objective lens 1710 and the near-field lens 232. This effective positive lens has a front focal plane (close to the imaging lens 1708) and a rear focal plane (farther away from the imaging lens 1708). For a flying head with an objective lens and a SIL lens as the near-field lens, the front focal plane may be within the objectiye lens. The optical train from the fixed optics module 1702 to the flying head 230 can be adjusted so that the reflective surface of the galvanometer mirror 2020 is imaged to the front focal plane of the flying head 230 (i.e., the objective/near-field lens assembly).

For example, the imaging lens 1708 may be adjusted relative to the objective lens 1710 and the galvanometer mirror 2020 to form the above telecentric configuration. Since the near-field lens 232 and the medium 1714 is in a near-field configuration, the reflected beam from the medium 1714 will retrace the read/write beam. This substantially reduces or eliminates this type of beam walk.

In a system where a prism or a transparent plate mounted on a galvanometer is used to control the angle of the read/write beam, the output facet of the prism or the transparent plate is imaged to the front focal plane of the objective/near-field lens assembly.

Beam walk can be caused by not only the location of the read/write beam but also other effects. In addition, some effects other than beam walk may also cause an unwanted non-zero offset in the averaged DC value of the NTES or TES.

For example, wavefront aberrations or ray aberrations (e.g., spherical aberration) can induce asymmetric energy distributions on the beam at the servo detector. Such effects cannot be completely compensated for by the telecentric configuration.

Figure 6:
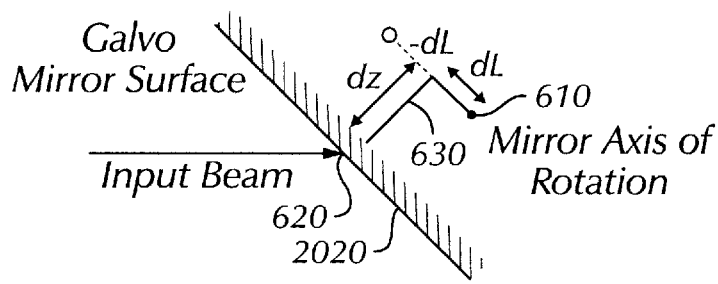
FIG. 6 is a diagram illustrating the offset of the rotation axis of the galvanometer with respect to a beam incident on the surface of the galvo mirror.

Certain system or component designs and optical misalignment may also cause beam walk even in the telecentric configuration. As an example, the rotation axis of the galvanometer 2020 in the system 2000 shown in FIG. 2 may not lie in the plane of the reflective surface of the mirror or may not be at the location where the beam center is if the rotation axis is in the reflective surface. Therefore, as the mirror rotates with the galvanometer around the rotation axis, the reflecting location on the mirror can change with the rotation angle of the galvanometer. This causes not only a change in the direction of the reflected beam off the mirror but also a translational movement of the reflected beam. FIG. 6 illustrates this condition where a reflective surface of a galvo mirror 2020 rotates about an axis 610 of rotation. A parameter, dz, indicates the distance from the reflective surface and the rotation axis 610 along the normal direction of the reflective surface. Another parameter, dL, indicates the distance between the normal 630 of the reflective surface at the point of the incidence 620 and the rotation axis 610 parallel to the reflective surface. For a given angular rotation, the change in the direction and the amount of the translational movement are different for different dz and dL. In particular, the translational movement of the beam can cause beam walk-off and may not be easily compensated by using the telecentric configuration.

Figure 7A:
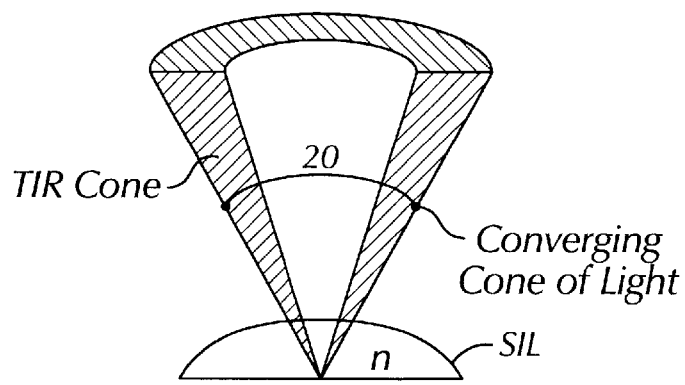
FIG. 7A is a diagram illustrating the total internal reflection cone formed by reflected rays from the flat surface of the near-field lens.
Figure 7B:
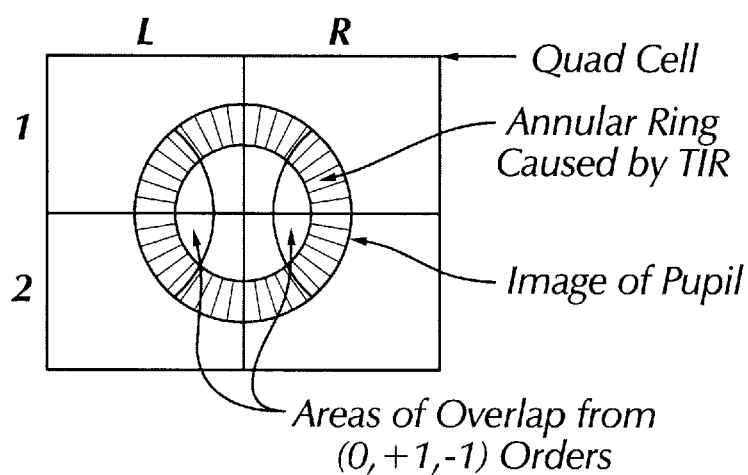
FIG. 7B is a.diagram illustrating received images in the reflected light from the near-field lens at the split detector with an annular pattern caused by the total internal reflection cone.

At the interface of the near-field lens with a high refractive index $n_{SIL}$ and the air gap with a low refractive index of n~1 between the medium and the near-field lens, frustrated total internal reflection can occur for the rays having incident angles to the interface larger than $\sin^{-1}(1/n_{SIL})$. The lens assembly formed of the objective lens and the near-field lens usually has a large numerical aperture (e.g., up to and larger than unity) and hence the rays in the perimeter of the beam may have incident angles larger than $\sin^{-1}(1/n_{SIL})$. This produces a cone of total internal reflection in the reflected beam in the absence of evanescent coupling to the medium as illustrated in FIG. 7A. In the presence of evanescent coupling, e.g., when the medium is in the near field of the near-field lens, the reflected beam may have a pattern as illustrated in FIG. 7B. When the beam entering the objective/near-field lens assembly is along the optical axis and normal to the interface of the near-field lens and the air gap, the total internal reflection generates a symmetric circular pattern on the servo detector and does not contribute to the TES signal. However, when the beam entering the objective/near-field lens assembly has an angle with respect to the optic axis, the cone of the total internal reflection becomes asymmetric so does the projected pattern on the servo detector by the cone. This results in an offset in the TES signal from the servo detector even when the beam is in a desired track on the medium.

Fresnel reflections of light rays having incident angles smaller than $\sin^{-1}(1/n_{SIL})$ from various interfaces in the optical train, including the transition interface from the near-field lens to the medium through the air gap, may also produce offsets in the TES signal. This is in part because the reflective coefficients at various surfaces depend on the respective incident angles. As a focused beam changes the incident angle, light rays in the cone of the focused beam can have different incident angles and thereby experience different reflectivities.

Furthermore,; imperfections in the lens coatings (e.g., anti-reflection coatings), can produce ghost reflections and contribute to the asymmetric energy distribution in the reflected beam. Such contribution from the imperfections in the near-field lens is particularly significant due to its high index of refraction.

Figure 8A:
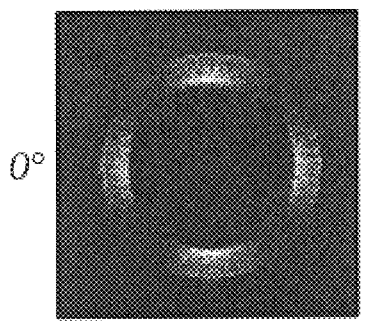
FIGS. 8A–8H are computer-simulated patterns in a reflected read/write beam at different incident angle with respect to the optic axis of the objective lens/near-field lens assembly based on a system as shown in FIG. 3.
Figure 8E:
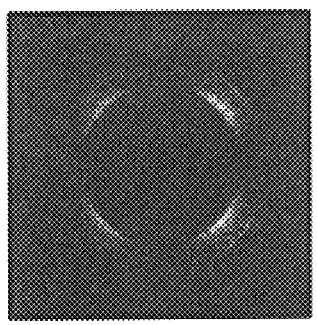
Figure 8B:
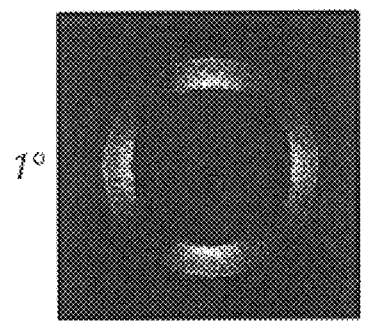
Figure 8F:
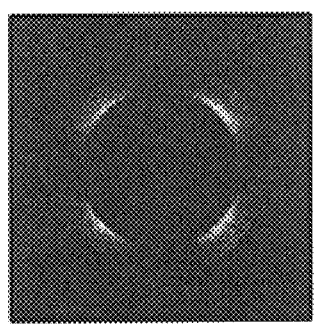
Figure 8C:
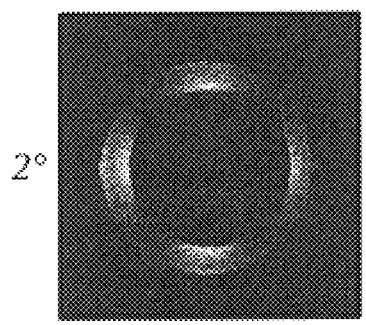
Figure 8G:
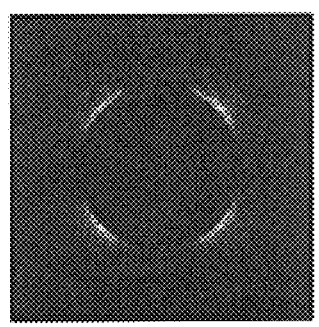
Figure 8D:
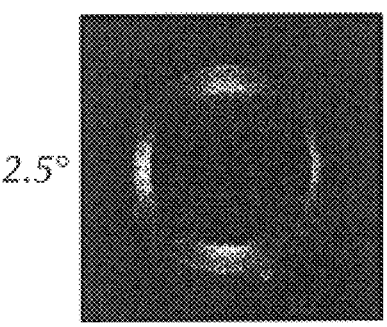
Figure 8H:
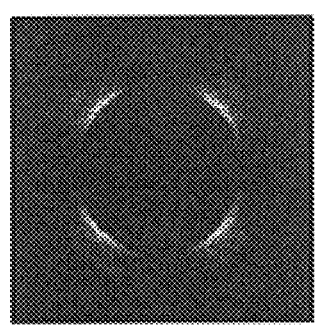

FIGS. 8A–8D show simulated patterns in a reflected read/write beam at different incident angle with respect to the optical axis of the objective lens/near-field lens assembly based on a system as shown in FIG. 3. Only the Fresnel reflections and total internal reflection are included in the simulation model and the effects of lens aberrations and beam walk-off are not considered. In FIG. 8A, a linearly-polarized beam propagates along the optical axis of the objective lens/near-field lens assembly, the reflection pattern is symmetric and does not contribute to TES offset. As described previously, the ring pattern is caused by the total internal reflection of the central rays at the interface of the near-field lens and the air gap between the lens and the recording medium. As the beam deviates from the optical axis, the intensity on one side of the ring increases while the intensity on the opposite side decreases. FIGS. 8B–8D respectively show reflected patterns when the beam deviates from the optical axis by 1, 2, and 2.5 degrees. FIGS. 8E–8H show simulated reflected ring patterns at the same beam deviations from the optical axis of the objective lens/near-field lens assembly but with an orthogonal polarization. Similar asymmetric intensity variations are produced.

Therefore, any or all the above and other effects can directly and indirectly cause unwanted offsets in the averaged DC value of the NTES or TES signal. This thus gives a false indication that the read/write beam is not centered on a desired track. Many of these offsets cannot be compensated by simply implementing the "telecentric" configuration of the first embodiment.

To reduce these offsets, a second embodiment uses a pseudo telecentric imaging configuration. This configuration deviates the imaging plane from the front focal plane of the objective/near-field lens assembly in a specified direction by an amount to reduce the overall incorrect offset in the averaged DC value of the NTES or TES. The specified direction and the amount of the deviation from the front focal plane are usually dependent on a specific system design and desired offset tolerance of a near-field optical storage system. The value can vary from one system to another.

Figure 9:
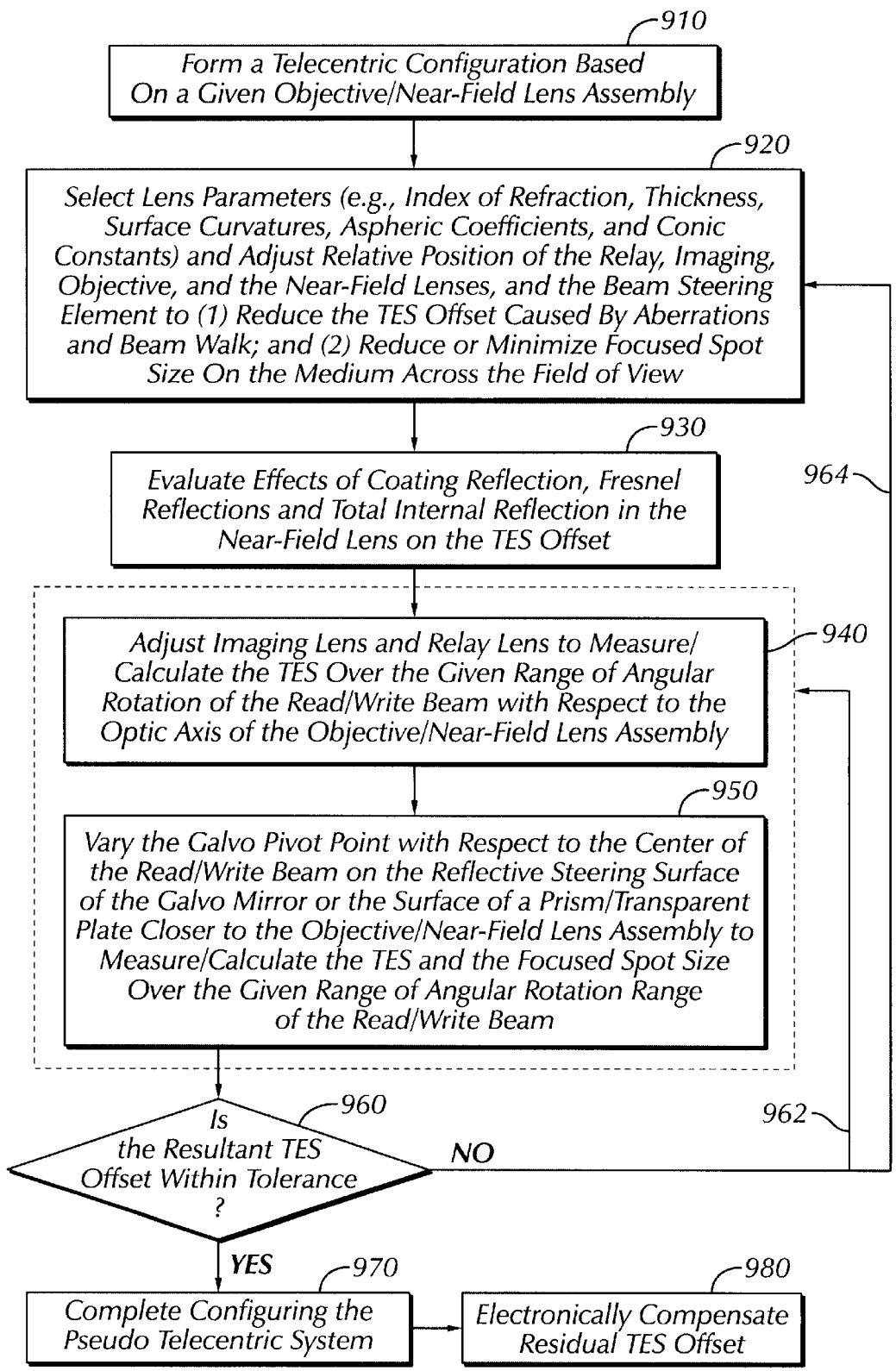
FIG. 9 is a flowchart showing an operation procedure to achieve a pseudo telecentric imaging configuration according to one embodiment of the invention.

FIG. 9 is flowchart showing the main steps in designing a near-field optical storage system in this second embodiment pseudo telecentric configuration. This procedure may be applied to any of the systems shown in FIGS. 2, 3, and 4A.

In step 910, an initial telecentric imaging system is formed by imaging the reflective surface of the galvo mirror to the front focal plane of the objective/near-field lens assembly. For a system using a prism or transparent plate mounted on the galvanometer, the optical steering plane of the prism or the transparent plate is imaged to the front focal plane of the objective/near-field lens assembly.

The angular range of the galvanometer may be limited to a given rotation range which corresponds to a given incident angular range of the read/write beam with respect to the optical axis of the objective/near-field lens assembly.

In step 920, the relative positioning of the relay lens, the beam steering element (e.g., a galvanometer mirror or a prism), the imaging lens, and the objective lens, the near-field lens is adjusted to achieve an optical configuration that is deviated from the initial telecentric system to reduce or minimize offsets caused by the optical aberrations and the beam walk-off caused by the different incident angles of the read/write beam. In addition, each lens in the optical train, such as the relay lens, the imaging lens, the objective lens and the near-field lens, may be configured by adjusting the index of refraction, the lens thickness, the surface curvature, the aspheric coefficient, and conic constant in order to reduce the incorrect TES offset.

This may be accomplished by, for example, placing a reflective surface such as a mirror at the exit surface of the near-field lens to reflect the read/write beam back to the fixed optical module. Use of the mirror eliminates the effects associated with the air gap and the medium, including the total internal reflection from the interface of the near-field lens and the air gap. The positioning of the relay lens, the imaging lens, objective lens, and the near-field lens can be adjusted to reduce or minimize the offset in the averaged DC value in the NTES signal generated from the servo detector. Adjusting the relative positioning and choosing the lens parameters may be done in an iterative manner. For example, with a chosen set of lenses, the relative positioning can be adjusted so that the TES offset is reduced. The lens parameters of one or more lenses may be adjusted to further reduce the TES offset. This process can be repeated until the TES offset is minimized or reduced to a level allowed by the system tracking error budget.

The above selection of lens parameters and adjustment of the relative position of lenses may also be used to reduce or minimize the focused spot size of the read/write beam on the medium. This is also indicated in step 920 in FIG. 9.

Next, the effects of the Fresnel reflections and the total internal reflection on the offset of the NTES can be evaluated (step 930). The mirror in the step 920 is removed so that the objective/near-field lens assembly is spaced from the medium by a thin air gap to form a near-field configuration. The galvanometer is rotated within the given angular range so that the offsets of the NTES are calculated or measured at different galvanometer angles.

At step 940, the positioning of the relay lens and the imaging lens is further adjusted to form a number of pseudo telecentric configurations that have at least some NTES offset values within the allowed error range for a given angular range of the galvanometer. The NTES signals for different configurations are measured or calculated.

The effect of the relative position of the rotation axis of the galvanometer relative to the reflective steering surface of the mirror or the steering plane of a prism/transparent plate may also be determined. This can be done in step 950. For example, in the system shown in the FIGS. 2 and 3, the relative position of the rotation axis of the galvanometer with respect to the beam center on the reflective surface of the galvo mirror can be varied to measure or calculate the NTES signals over a given angular range. This step further provides NTES signals for evaluation of various pseudo telecentric configurations.

Any one or any combination of the steps 940 and 950 may be used to produce a desired pseudo telecentric configuration. It may not be necessary to perform the steps 940 and 950 under some conditions.

A pseudo telecentric configuration after step 940 and/or step 950 may not be the optimized configuration for all the galvanometer angles within the desired range or all allowed offsets of the rotation axis relative to the beam center on the galvo mirror. Different angular ranges may require different pseudo telecentric configurations to reduce or minimize offsets in the NTES within the allowed error range.

If a desired pseudo telecentric configuration is not obtained after steps 940 and/or 950, then at least one of the steps 940 and 950 may be repeated one or multiple times until the desired pseudo telecentric configuration is achieved. This is indicated by the iteration loop 962.

If the iteration 962 still cannot reduce the TES offset to the tolerance range, the lens parameters and the relative positioning of the components in the optical train may need to be re-adjusted as shown by an iteration loop 964.

At step 970, one or more suitable pseudo telecentric configurations are obtained which have an imaging plane at a location deviated from the front focal plane of the objective/near-field lens assembly. The total offset in the TES signal is significantly reduced compared to the initial telecentric configuration obtained at step 910.

In general, some residual offset in the TES signal may still exist in one or more suitable pseudo telecentric configurations resulted from the step 970. A further compensation may be performed electronically to reduce or minimize the residual offset (step 980). For example, an electrical compensation signal may be added to the output of the servo detector or in the tracking control circuit to cancel out the residual offset.

Figure 10:
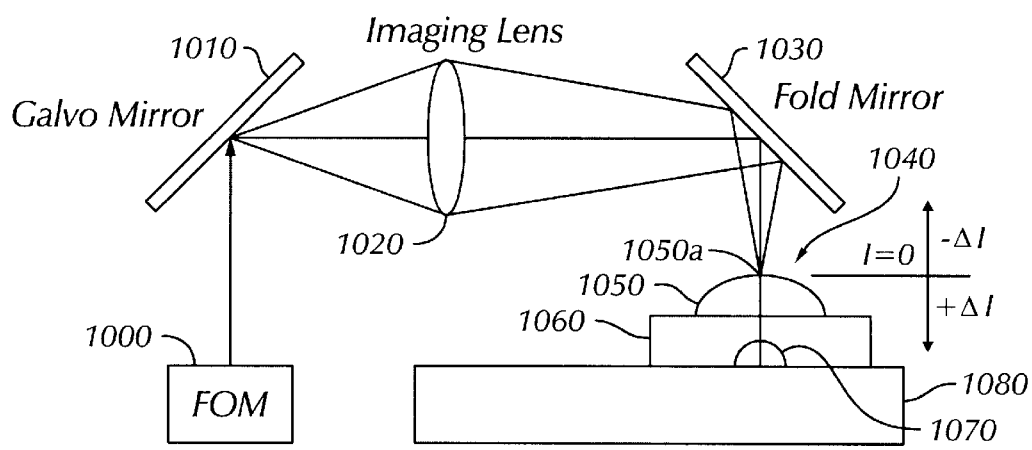
FIG. 10 is a diagram showing a simplified near-field optical storage system in a pseudo telecentric configuration.

The above procedure for configuring a pseudo telecentric configuration can be applied to a simplified near-field optical storage system shown in FIG. 10. A galvo mirror 1010, an imaging lens 1020, and a fold mirror 1030 form an optical path between a fixed optical module 1000 and a flying head 1040. The flying head 1040 includes an objective lens 1050, a slider 1060, and a near-field SIL 1070. An medium 1080 is spaced from the flying head 1040 in a near-field configuration.

Several parameters may be adjusted to form different pseudo telecentric configurations. The galvo angle, which is defined as zero when the beam incident on the flying head is parallel to the optical axis of the flying head, can be varied within an angular range for beam tracking. The angular range can affect the pseudo telecentric configuration. The position of the rotation axis of the galvo mirror 1010 may be offset with respect to the center of the beam on the reflective surface in many practical systems. Referring to FIG. 6, parameters dz and dL can be used to indicate the relative positioning of the rotation axis of the galvo mirror 1010 with respect to the center of the beam on the reflective surface. Furthermore, the image of the galvo mirror 1010 produced by the.imaging lens 1020 relative to the front vertex 1050a of the objective lens 1050 can be used to indicate the relative position of the imaging lens 1020 between the galvo mirror 1010 and the objective lens 1050.

Figure 11A:
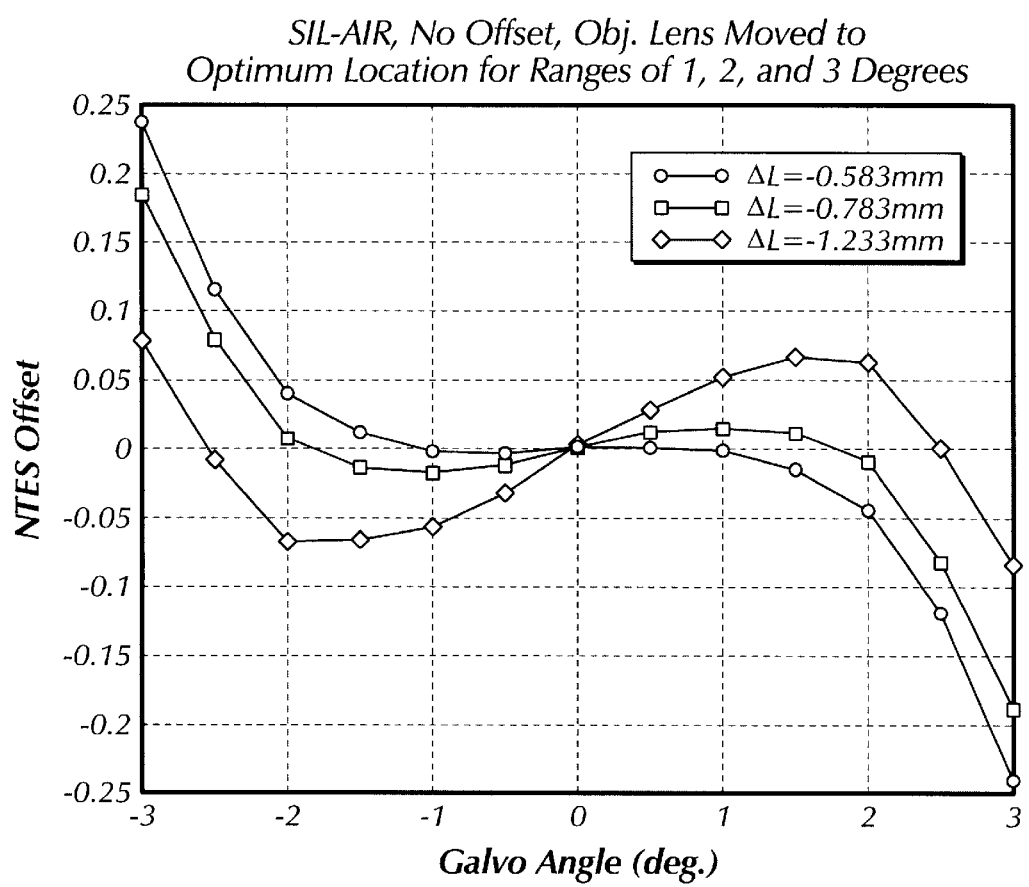
FIG. 11A is a chart of simulated NTES as a function of the galvo angle for three pseudo telecentric configurations (optimized for 1, 2, and 3 degrees) of the near-field assembly in FIG. 10 based on the procedure shown in FIG. 9.

FIG. 11A shows the simulated NTES offset as a function of the galvo angle for three pseudo telecentric configurations of the near-field assembly in FIG. 10 based on the procedure shown in FIG. 9. The simulated results are obtained without the medium 1080 and dz=dL=0. The image of the galvo mirror 1010 is on the lower side of the front vertex 1050a of the objective lens 1050 by *0.583* mm, 0.783 mm, and 1.233 mm in order to minimize the TES offset for a galvo angular range of 1, 2, 3, degrees, respectively.

Figure 11B:
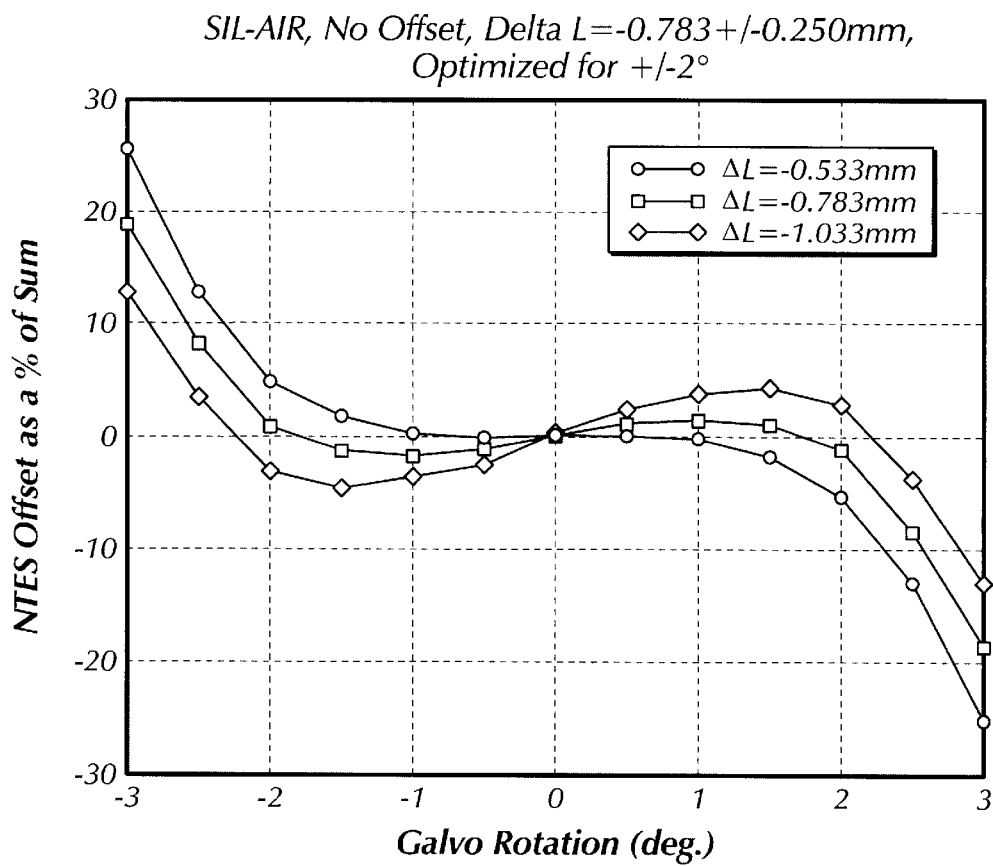
FIG. 11B is a chart of simulated variation of the NTES offset as a function of the galvo angle for a pseudo telecentric configuration (optimized for ±2 degrees) of the near-field system in FIG. 10 based on the procedure shown in FIG. 9.

FIG. 11B shows the simulated NTES offset as a function of the galvo angle for a pseudo telecentric configuration of the near-field system in FIG. 10 based on the procedure shown in FIG. 9. The simulated results are obtained without the medium 1080 and dz=dL=0. The image of the galvo mirror 1010 is on the lower side of the front vertex 1050a of the objective lens 1050 by 0.783 mm, which corresponds to a minimum TES offset over the galvo range of ±2 degrees. The curves represented by the circles and diamonds indicate the variation caused by an error of 0.25 mm in the image position.

Figure 11C:
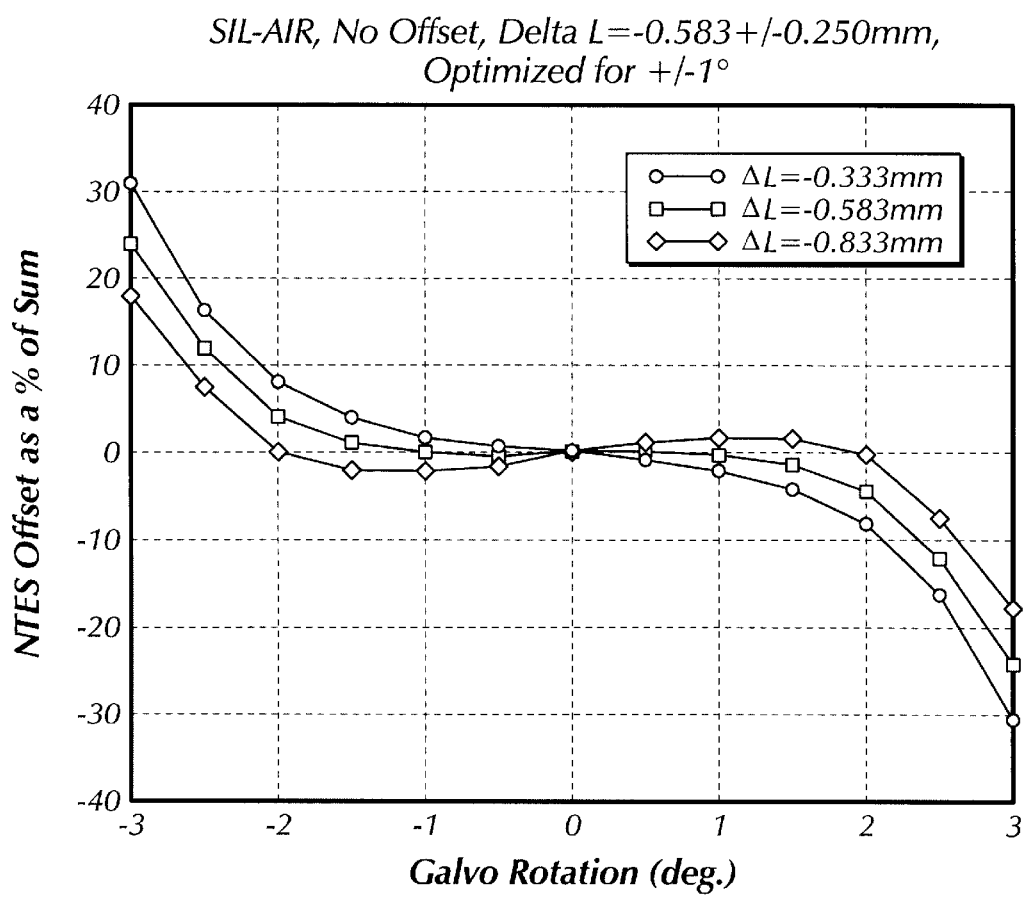
FIG. 11C shows the simulated variation of the NTES offset as a function of the galvo angle for another pseudo telecentric configuration (optimized for ±1 degrees) of the near-field system in FIG. 10 based on the procedure shown in FIG. 9.

FIG. 11C shows the simulated NTES offset as a function of the galvo angle for another pseudo telecentric configuration of the near-field system in FIG. 10 based on the procedure shown in FIG. 9. The simulated results are obtained without the medium 1080 and dz=dL=0. The image of the galvo mirror 1010 is on the lower side of the vertex 1050a by 0.583 mm, which corresponds to a minimum TES offset over the galvo range of ±1°. The curves represented by the circles and diamonds indicate the variation caused by an error of ±0.25 mm in the image position.

Figure 12A:
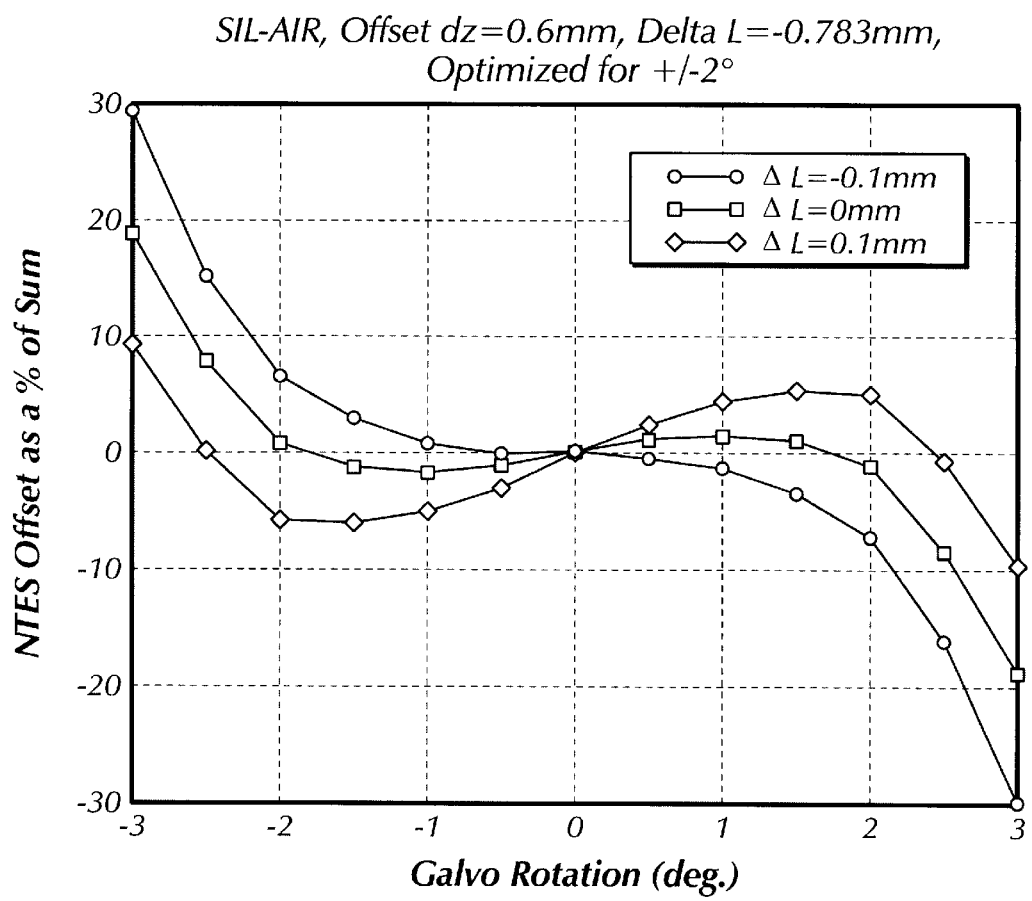
FIG. 12A is a chart showing the simulated variation of the NTES offset as a function of the galvo angle for a pseudo telecentric configuration (optimized for ±2 degrees) with different offset dt with a fixed distance of 0.6 mm between the rotation axis and the galvo mirror surface.

FIG. 12A shows the simulated NTES offset as a function of the galvo angle for a pseudo telecentric configuration with different values for the parameter dL. The simulated results are obtained without the medium 1080 and dz=0.6 mm. The image of the galvo mirror 1010 is on the lower side of the front vertex 1050a of the objective lens 1050 by 0.783 mm, which corresponds to a minimum TES offset over the galvo range of ±2 degrees. The curves represented by the circles and diamonds indicate the variation caused by an error of 0.1 mm in the parameter dL.

Figure 12B:
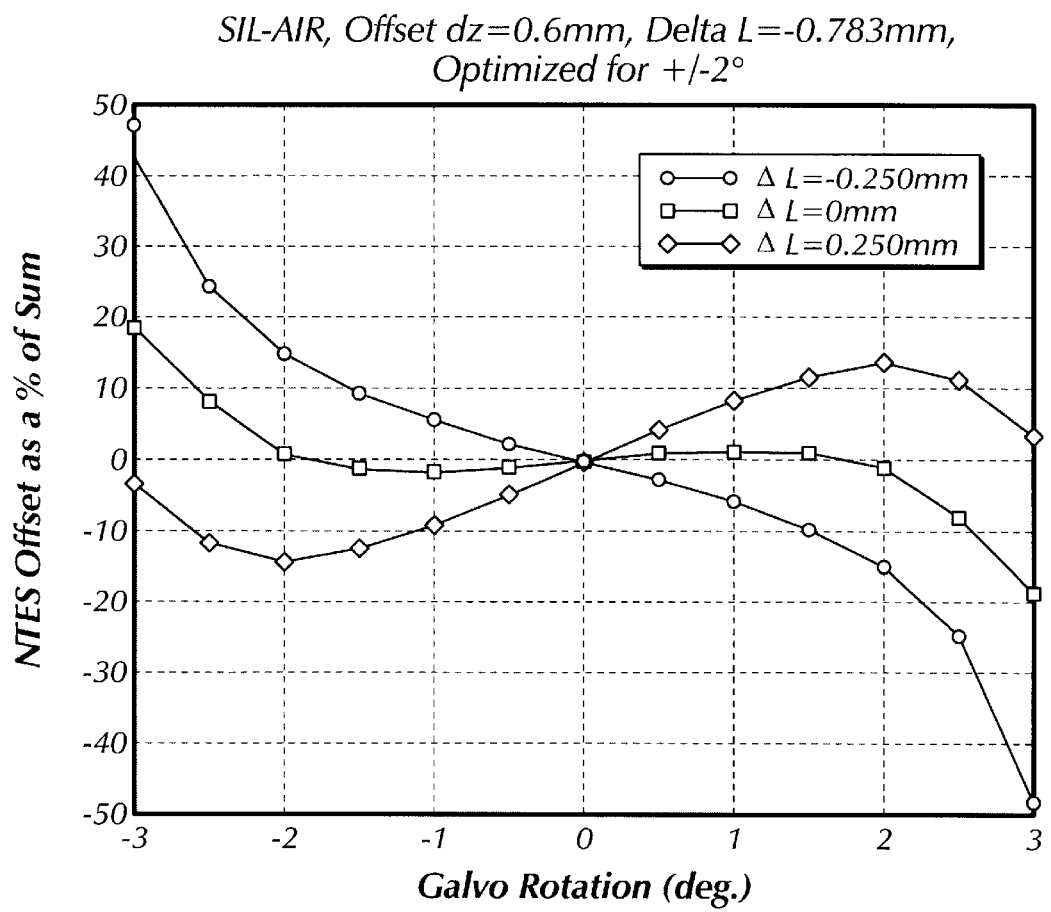
FIG. 12B is a chart of the simulated variation of the NTES offset as a function of the galvo angle for the same pseudo telecentric configuration as in FIG. 12A but with different values for the offset parameter dt.

FIG. 12B shows the simulated NTES offset as a function of the galvo angle for the same pseudo telecentric configuration as in FIG. 12A but with different values for the parameter dL. The curves represented by the circles and diamonds indicate the variation range caused by an error of 0.25 mm in the parameter dL.

A comparison of FIGS. 11B and 12B indicates that the NTES offset is more sensitive to the error in the parameter dL than to the error in the image location.

Figure 13:
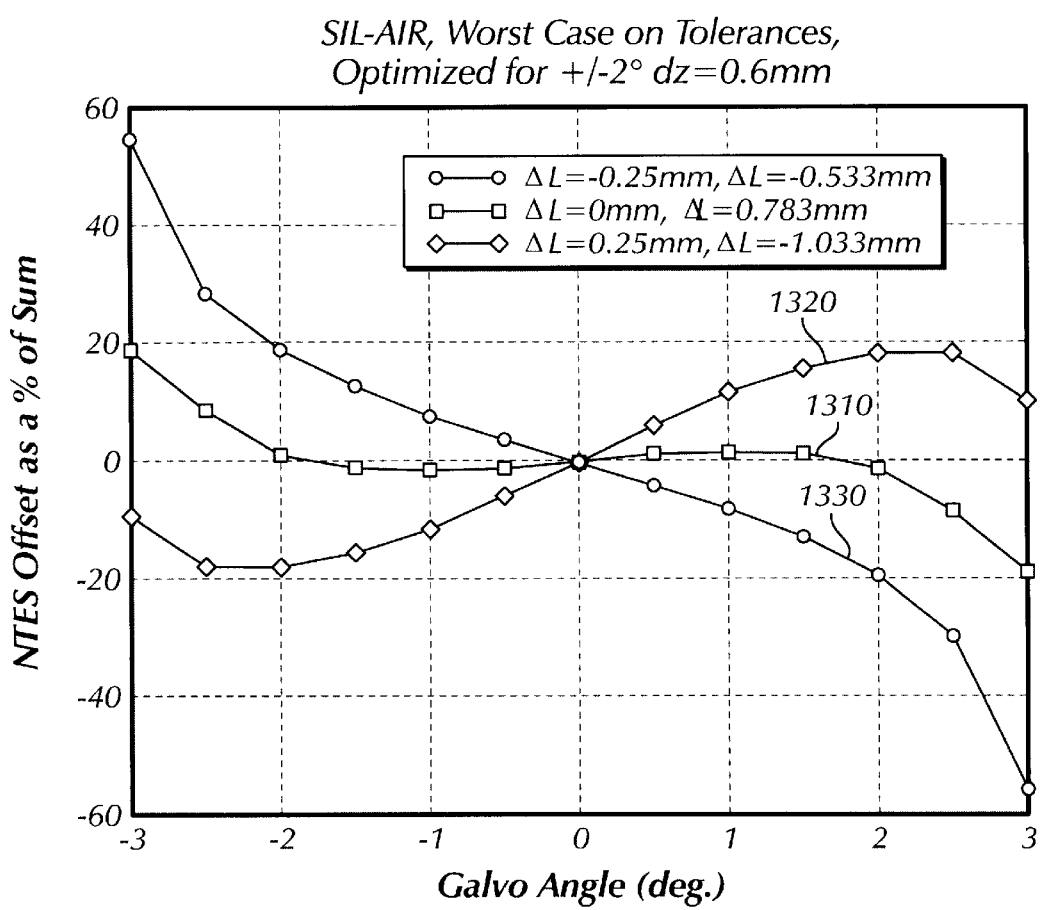
FIG. 13 is a chart showing the NTES offset in several telecentric configurations for the system of FIG. 10.

FIG. 13 shows the stimulated NTES offset as a function of the galvo angle in several pseudo telecentric configurations based on the system of FIG. 10. The distance, dz, between the rotation axis and the reflective surface of the galvo mirror is fixed at 0.6 mm.

Although the present invention has been described in detail with reference to the preferred embodiments, various modifications and enhancements may be made without departing from the spirit and scope of the invention.

For example, although galvanometer-controlled transparent plate, prism and mirror are described as the beam steering element to provide fine beam positioning and tracking, other forms of beam steering elements may also be used. Referring to FIG. 2, for example, the beam steering element assembly 2020 of the galvanometer 2022 and the reflector 202 may be replaced by electro-optic beam deflectors, acoustooptic beam deflectors, and micro-machined actuators depending on the requirements of specific implementations.

For another example, although a near-field lens is disclosed to effect near-field coupling between the optical head and the medium, it should be understood that the same techniques can be applied to optical storage systems with other types of near-field optical coupling elements, including a solid immersion mirror, a tapered optical fiber near-field recording head, or a high-index slide with a diffractive optical element (e.g., lens). See, Lee et al., "Feasibility study on near field optical memory using a catadioptric optical system," Optical Data Storage, 1998 Technical Digest Series, Vol. 8 and Japanese laid-open patent application No. 8-245053 by Hatakoshi et al., which are incorporated herein by reference.

In addition, the objective lens and the near-field lens can be structurally integrated together or effected by a monolithic piece. For example, a GRIN lens can be used to effect a single lens with front and rear focal planes that has the optical functions of a separate objective lens and a near-field lens. See, the above referenced copending application Ser. No. 08/846,916.

All these and other variations are intended to be encompassed by the following claims.

What is claimed is:

1. An optical storage system, comprising:
   a medium holder adapted to hold an optical storage medium at a specified position;
   an optical beam steering element disposed relative to said medium holder and having an optical steering plane to receive an optical beam and direct said optical beam to a desired direction by steering said optical steering plane;
   an optical head disposed in a path of said optical beam to couple optical energy to and from said optical storage medium, said optical head configured as a lens assembly with a first and second focal planes which includes a solid immersion lens, wherein said first focal plane is closer to said optical beam steering element than said second focal plane; and
   an imaging lens disposed between said optical beam steering element and said optical head to image said optical steering plane of said optical steering element to an image plane that is spaced from said first focal plane to form a pseudo telecentric imaging system formed by said imaging lens and said lens assembly of the optical head, a spacing between said image plane and said first focal plane being set at a value to achieve a substantially symmetric energy distribution in a reflected beam from said optical medium and said lens assembly.

2. A system as in claim 1, wherein said optical steering element comprises an electro-optic beam deflector.

3. A system as in claim 1, wherein said optical steering element comprises an acoustooptic beam deflector.

4. A system as in claim 1, wherein said optical steering element comprises a micro-machined actuator.

5. A system as in claim 1, wherein said optical steering element comprises a galvanometer, and a reflective surface engaged to rotate with said galvanometer, wherein said optical steering plane is a portion of said reflective surface.

6. A system as in claim 1, wherein said optical steering element comprises a galvanometer and a prism mounted on said galvanometer, and wherein said optical steering plane is a portion of a transmissive surface of said prism.

7. A system as in claim 1, wherein said optical head is positioned relative to said medium holder during a reading or writing operation to place said solid immersion lens from said optical medium by less than one wavelength of said optical beam.

8. A system as in claim 1, wherein said optical head is positioned relative to said medium holder during a reading or writing operation to place said solid immersion lens at a position from said optical medium to couple energy to or from said optical medium at least in part by evanescent fields.

9. A system as in claim 1, wherein said optical head is positioned relative to said medium holder during a reading or writing operation to place said solid immersion lens at a position from said optical medium by a distance greater than one wavelength of said optical beam to couple optical energy without evanescent coupling.

10. A near-field optical system, comprising:
    a medium holder adapted to hold an optical storage medium at a specified position;
    an optical steering beam element disposed relative to said medium holder, receiving an optical beam and directing said optical beam from an optical steering plane;
    an objective lens located relative to said optical beam steering element in a path of said optical beam;
    a near-field lens disposed between said objective lens and said optical storage medium and positioned from said optical storage medium by a spacing less than one wavelength of said optical beam, wherein said near-field lens and said objective lens collectively effects a lens assembly with first and second focal planes wherein said first focal plane is closer to said optical beam steering element than said second focal plane; and an imaging lens disposed between said optical steering element and said objective lens to image said optical steering plane of said optical steering element to an imaging location that is positioned away from said first focal plane by a spatial deviation to achieve a substantially symmetric energy distribution in an optical beam being reflected from said optical medium and transmitting through said lens assembly.

11. A system as in claim 10, wherein said lens assembly formed by said objective lens and near-field lens has a numerical aperture greater, than unity.

12. A system as in claim 10, wherein said near-field lens includes a solid immersion lens or a GRIN lens.

13. A system as in claim 10, further comprising an optical detector positioned relative to said an optical steering beam element.

14. A system as in claim 10, wherein said optical beam steering element includes a galvanometer that controls a direction of said optical steering plane.

15. A system as in claim 10, wherein said medium holder is removably engaged to said optical storage medium.

* * * * *